United States Patent [19]

Brusewitz et al.

[11] Patent Number: 6,038,257
[45] Date of Patent: Mar. 14, 2000

[54] MOTION AND STILL VIDEO PICTURE TRANSMISSION AND DISPLAY

[75] Inventors: Harald Brusewitz, Älvsjo; Bo Burman, Upplands Väsby; Göran Roth, Stockholm, all of Sweden

[73] Assignee: Telefonaktiebolaget L M Ericsson, Stockholm, Sweden

[21] Appl. No.: 08/815,805

[22] Filed: Mar. 12, 1997

[51] Int. Cl.[7] .................................. H04N 7/18; H04N 7/24
[52] U.S. Cl. ............................ 375/240; 348/18; 348/424
[58] Field of Search ..................................... 348/384, 390, 348/397, 399, 424, 425, 7, 10, 12, 13, 15, 17, 18, 19; 386/68, 69, 70, 81, 82; 375/240

[56] References Cited

U.S. PATENT DOCUMENTS

| | | | |
|---|---|---|---|
| 4,654,484 | 3/1987 | Reiffel | 348/17 |
| 4,873,577 | 10/1989 | Chamzas | 348/390 |
| 5,142,362 | 8/1992 | Masera | 348/384 |
| 5,191,415 | 3/1993 | Matsunaga | 348/424 |
| 5,426,513 | 6/1995 | Scorse | 358/433 |
| 5,440,343 | 8/1995 | Parulski et al. | 348/316 |
| 5,493,329 | 2/1996 | Ohguchi | 348/17 |
| 5,691,767 | 11/1997 | Tahara | 348/384 |

FOREIGN PATENT DOCUMENTS 0 451 696 A2  4/1991  European Pat. Off. .
WO 94/03014  7/1992  WIPO .

Primary Examiner—Bryan Tung
Attorney, Agent, or Firm—Jenkens & Gilchrist

[57] ABSTRACT

An imaging system and method for alleviating perceptional problems of a viewer during the transmission and display of high resolution still images on a video system is disclosed. Through modifications to an encoder and decoder within the imaging system, the viewer may select a still image or portion thereof from a video image sequence for viewing. The imaging system and method ameliorate perceptional delays in displaying the lengthy high resolution still image by immediately displaying a lower-resolution, shorter-length video image frame corresponding to the still image. The lower resolution video image being displayed is then updated and refined with the image data from the high resolution still image as it is received.

25 Claims, 4 Drawing Sheets

MOTION AND STILL VIDEO PICTURE TRANSMISSION AND DISPLAY

BACKGROUND OF THE PRESENT INVENTION

1. Field of the Invention

The present invention relates generally to an electronic imaging system and method, particularly, to an improved imaging system and method for displaying still images, and, more particularly, to an imaging system and method for improving the display of a high resolution still image through integration with a corresponding lower resolution video image.

2. Background and Objects of the Present Invention

With the rise of the consumer electronics industry over the past few decades, a variety electronic imaging systems of increasing complexity have emerged, e.g., video recorders, camcorders and the like. Video devices have recently become available that are able to not only capture moving or motion images, e.g., in National Television Standards Committee (NTSC) video format, but also capture a still image in a still image mode.

One difference between the two imaging modes, however, as noted in U.S. Pat. No. 5,440,343, is that whereas video has, for example, only 480 lines of image information per frame (compared to a 525 scan line format for NTSC television), a high resolution still image may require several times that resolution per frame. Consequently, the video operator must select a desired mode of imaging and resolution for a particular image, e.g., a sequence of low resolution NTSC images under (video) motion mode or a plurality of high resolution images under still image mode, as described in said U.S. Pat. No. 5,440,343. In other words, still images, being much more detailed, are processed separately, independent of and distinct from the video transfer.

One problem with the aforedescribed dual imaging mode approach currently used in the art, however, is that it may take a long time for a high resolution still image to be transmitted and displayed. Since video devices are designed primarily for capturing and storing lower resolution video images, the data paths for the video bit stream are designed to optimize video image throughput. Consequently, when the user switches to still image mode and captures an image, the much larger high resolution image takes longer to traverse those data paths, i.e., more time is required to process and display the more detailed image. This perceptional delay to the viewer is further accentuated by the nature of the display of such images, i.e., the still image is usually divided into a multiplicity of discrete image blocks or segments, which are sequentially processed and displayed. To the viewer, the still image is displayed slowly and in pieces.

Another and more serious drawback to conventional video systems employing a still image mode feature occurs whenever transmission errors damage some or all of the image segments during still picture transfer. Unlike a video imaging sequence where the effect of one bad image frame is masked by numerous contiguous image frames (occurring at the 30 frames per second NTSC standard rate), all or a portion of the "single frame" still image may be missing or severely distorted, creating other perceptional difficulties for the viewer.

Accordingly, it is a first object of the present invention to provide an imaging system and method that overcomes or ameliorates the negative perceptional effects on a viewer of image display delays.

It is also an object of the present invention to ameliorate any negative viewer perceptions whenever still image transfer errors occur.

SUMMARY OF THE INVENTION

The present invention is directed to an imaging system and method for alleviating perceptional problems of a viewer during the transmission and display of high resolution still images on a video system. Through modifications to an encoder and decoder within the imaging system, the viewer may select a still image or portion thereof from a video image sequence for viewing. The imaging system and method ameliorate perceptional delays in displaying the lengthy high resolution still image by immediately displaying a lower-resolution, shorter-length video image frame corresponding to the still image. The lower resolution video image being displayed is then updated and refined with the image data from the high resolution still image as it is received.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
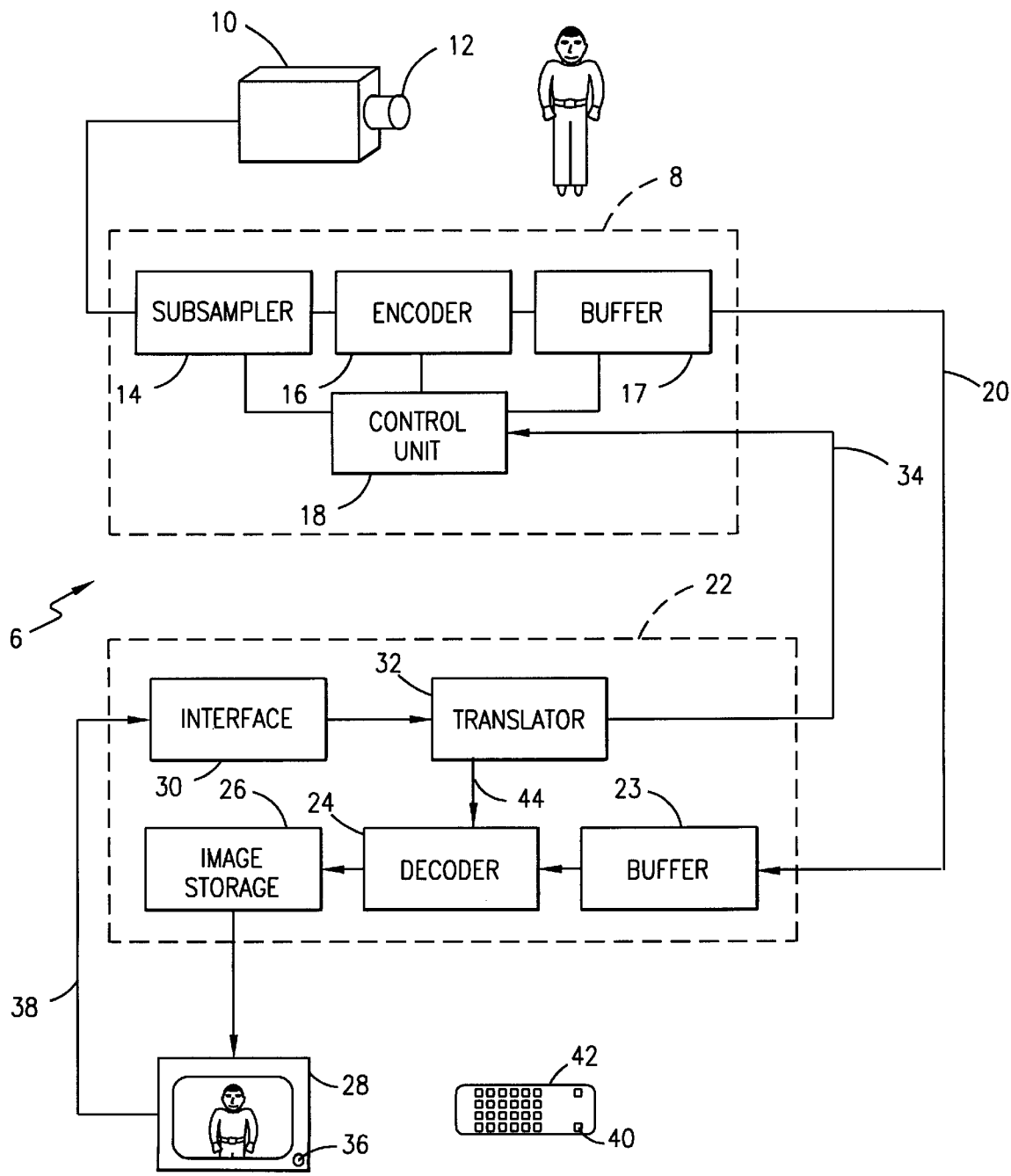
FIG. 1 is a block diagram illustrating an electronic imaging system in accordance with the present invention.

With reference now to FIG. 1 of the drawings, there is illustrated an electronic imaging system, generally represented by the numeral 6, which incorporates the subject matter of the present invention. The imaging system 6 in the figure includes a sending device 8 which receives signals from a camera 10 which captures and records an optical image, such as the individual depicted. It should be understood that various portions of camera 10 which are not related to the present invention, for example, the diaphragm, shutter and the like, are not illustrated.

Accordingly, as is understood in this art, the optical image is received by a camera lens 12 and converted into an analog video signal, e.g., by a conventional charge coupled device (not shown). It should also be understood that camera 10 may be a digital camera forwarding digital image data to a subsampler device 14. If camera 10 is not digital, however, and analog-to-digital conversion is required, then device 14 may also function as an A/D converter, as is understood in the art.

The subsampler device 14 determines pixel values representing the captured video image at a particular spatial resolution, i.e., pixels per line and lines per image, and temporal resolution, i.e., images per second. Another parameter related to both spatial and temporal resolution is quantization, i.e., a measure of the amount of distortion present in the video signal, as will be described in more detail hereinafter.

An encoder 16 encodes the aforedescribed digital image data into a video signal stream, which flows into a buffer 17. As is understood in the art and discussed further herein, the rate of flow of information from the encoder 16 into buffer 17 varies in accordance with the degree of encoding. Additionally, the video signal stream typically includes compressed signals, in which information has been condensed or compressed by the encoder 16 to facilitate transmission or storage. One set of such compression technologies are those specified by the Moving Picture Experts Group (MPEG), a standard in accord with the International Organization for Standardization/International Electrotechnical Commission (ISO/IEC). Other compression technologies are the H.261, H.262 and H.263 standards of the International Telecommunications Union, Teleconferencing Section (ITU-T) for video teleconferencing.

In conjunction with these image data formatting standards and techniques, by which the encoder 16 provides a syntax for the subsequent bitstream, the encoder 16 employs compression algorithms, such as Discrete Cosine Transforms (DCT), Huffman coding and other mechanisms, whereby the amount of data needed to represent the image is drastically reduced while substantially retaining image integrity. As is well understood by those skilled in the art, these and other techniques eliminate or reduce the transmission of frame-to-frame redundancies and other information which are unnecessary or repetitive, and exploit various physiological and psychological aspects of human perception to present a coherent image to the viewer's eye.

With further reference to FIG. 1, the subsampler 14, encoder 16 and buffer 17 are controlled by a control unit 18, which also controls other functions of the imaging system 6. For example, control unit 18 controls the sequencing of the aforedescribed operations, i.e., image pickup by camera 10 through a connection thereto (not shown), pixel conversion in subsampler 14, compression in encoder 16, recording the encoded images on a recording medium (not shown), and other operations. Control unit 18 supplies encoder 16 with a plurality of operating parameters to govern the aforementioned transformation of pixel data into a corresponding compressed bitstream. As discussed, control unit 18 also governs the variable bit rate of the information flow into buffer 17 to maintain a particular data level and avoid both overflow and underflow therein.

As is understood in this art, the primary purpose of buffer 17 is to regulate the flow of data from the encoder 16 and forward that data at a fixed or a particular variable rate across a transmission channel 20 to a receiver device 22, particularly, to another buffer 23 therein, which like buffer 17 acts as a reservoir storing the data and regulating its use. Buffer 23 forwards the received image data, at a fixed or variable rate as needed to a decoder 24. Similarly to the encoding process, the decoder 24 reverses the aforedescribed compression algorithms to expand the image pursuant to the aforementioned operating parameters. In other words, the decoder 24 decompresses the compressed information in the bit stream and reconstitutes the image pursuant to the relevant image format, e.g., the ITU-R/601 Digital Studio Standard, and the operating parameters, e.g., an indication for a high resolution still image, a conventional video signal at 30 frames per second, a video signal with any other frame rate defined by the standard of use, a video signal with any level of spatial resolution defined by the standard in use, etc. The reconstituted image is then placed within an image storage device 26, the contents of which may be continuously displayed on a video display 28, the circuitry of which is understood in the art.

As discussed, the aforedescribed compression technologies employ various techniques to condense the image information. The decoder 24 is configured to interpret the format and operating parameters by which the image information was encoded by encoder 16. As is understood in the art, much of the decoding process performed within the decoder 24 may be called "normative", i.e., fixed by the particular standard, e.g., MPEG. Consequently, the decoder 24 recognizes these normative parts of a signal from encoder 16, i.e., how to interpret the transmitted bits in the bit stream. It should, therefore, be understood that the decoder 24 must be able to understand the particular video format used, e.g., the aforementioned ITU-R/601 or other standard, and the various compression algorithm standards, e.g., ISO/IEC MPEG-1, MPEG-2, and the upcoming MPEG-4, and ITU-T H.261, H.262 and H.263, i.e., the normative parts. Although decoder 24 is preferably of conventional design and therefore able to understand the pertinent normative communication signals, it should be understood that decoder 24 may also be configured to accept non-normative commands, i.e., commands or information outside the particular standard being used, as described hereinafter.

Regarding non-normative communication, as further illustrated in FIG. 1, receiver 22 also includes a human interface device 30, through which many of the aforedescribed operating parameters may be adjusted, e.g., to modify image clarity (resolution), frequency (frame rate) and other characteristics. The human interface device 30, which may include a button, slide, keyboard or other conventional interface apparatus, forwards the indicated changes to a translator 32, which converts the changes to a signal. The aforedescribed signal is then sent back to the control unit 18 of the sending device 8 via a backchannel 34. The operations of the subsampler 14, encoder 16 and buffer 17 may then be modified by the control unit 18 in accordance with the particular signal given, e.g., to forward an image in still mode. As discussed more fully in Applicants' co-pending patent application entitled "Improved Imaging System and Method for Interactive Control of Image Quality", filed concurrently herewith and incorporated herein by reference, by pressing or turning a button 36 (constituting interface 30 or connected thereto via a connection 38) on the display device 28 or a like button 40 on a remote device 42 also shown in FIG. 1, the translator 32 may forward a particular codeword or other indicia indicating the particular command corresponding thereto back to the encoder 16, which adjusts its operations accordingly.

It should also be understood that the decoder 24 in an alternate embodiment of the present invention, in addition to receiving the normative commands from the encoder 16, may receive the aforementioned nonnormative commands from the translator 32. In other words, the viewer may request a change, by pressing or turning button 36 or 40 connected to the interface 30, and that change may then be transferred from the translator 32 via a connection 44 and implemented within the decoder 24, modifying the image stream therein.

By means of the video system configuration set forth in FIG. 1 and as set forth in the co-pending patent application of applicants, conventional video imaging capabilities may be combined with still image management. For example, the video imaging system 6 may operate in normal video mode, displaying a typical 30 frame per second sequence of images at a usual video resolution. However, when the user observes something of interest in the video, the user may request a higher resolution still image in order to study the view in more detail. For example, the viewer of the display 28 in FIG. 1 may want to get a more detailed image of the individual depicted. As discussed in more detail in said co-pending application, the viewer may access the human interface 30 of receiver 22, e.g., through button 36 on the display device 28 or button 40 on the remote device 42, via backchannel 34, to generate a still image. Further, the viewer may, through the aforedescribed operating parameters, modify the image prior to taking the snapshot, e.g., zoom in on a part of the image, adjust color, contrast or resolution quality, or make other modifications via a connection between control unit 18 and the camera 10 (not shown).

As discussed, since high resolution images require a much greater number of bits than that of conventional video image frames, e.g., the number of bits in a low resolution video image may be an order of magnitude smaller than that of a high resolution still image, the transmission of such an image usually takes much longer than 1/30th of a second, as in video image frames. While the high resolution image is being processed, the production of video image frames is either suspended or continues at a lower bit rate, e.g., through interleaving with the high resolution image. In any event, conventional video systems employing still picture capabilities handle the two images differently and independently. As a consequence, if any transmission errors occur during the transfer of a high resolution still image, the expected picture may be severely distorted, whereas such distortions within a particular video image frame are easily masked by the surrounding frames in the image sequence.

As discussed, the problems of such image distortion, as well as the long delays in processing high resolution images within a video system, and their solution are the subject of the present invention.

Figure 2:
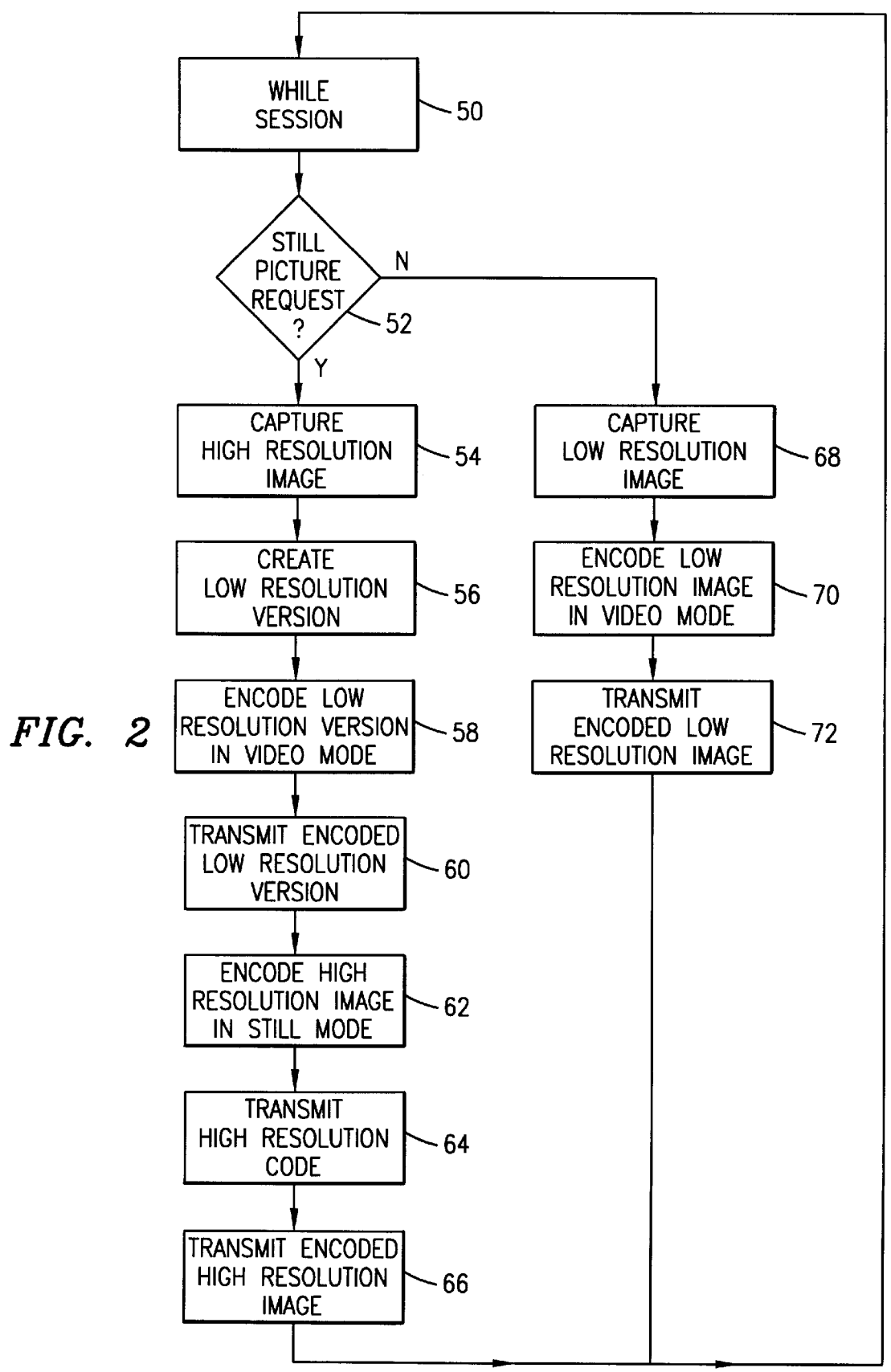
FIG. 2 is a flowchart illustrating various steps in a sending device of the electronic imaging system of FIG. 1 in accordance with the present invention.

With reference now to FIG. 2, there is shown a flowchart illustrating various steps in a method according to the present invention. As discussed, while images are being transmitted (box 50), control unit 18 governs the operations of the encoder 16 in accordance with the values of the aforementioned operational parameters, one of which is a command indicating a still image request, described in more detail hereinafter. Upon receipt of this request (box 52), normal video image frame transmission (video mode) operations are suspended, and a high resolution image is captured (box 54) and forwarded to encoder 16 for further processing. In this embodiment of the present invention, the subsampler 14 downsamples the high resolution still image into a low resolution version (box 56) and encodes it as a video mode signal (box 58). This low resolution copy of the more detailed image is then transmitted (box 60) via transmission channel 20 and buffer 23 to decoder 24, which quickly displays the low resolution image, as will be described in more detail hereinafter in connection with FIG. 3. In this manner, a representation of the lengthy high resolution still image is immediately displayed, ameliorating the perception of lengthy transmission and processing delays. Alternatively, it should be understood that the creation of the lower resolution copy, i.e., steps 56, 58 and 60, may be omitted and, instead, the decoder 24 places the latest video image received on display 28, as described in more detail hereinafter.

After transmission of the low resolution image (box 60) and contemporaneous with its display, encoder 16 encodes the captured high resolution image (box 62) in still mode and forwards a high resolution transmission command or code (box 64), akin to the aforementioned still image request, to the decoder 24 for proper decompression when the associated image information is sent (box 66). Upon completion of the high resolution image transmission, control is returned to box 50. With further reference to FIG. 2, if no still picture request has been received (box 52), then the normal video mode operations of capture (box 68), encode (box 70) and transmit (box 72) video images occur until interrupted.

Figure 3:
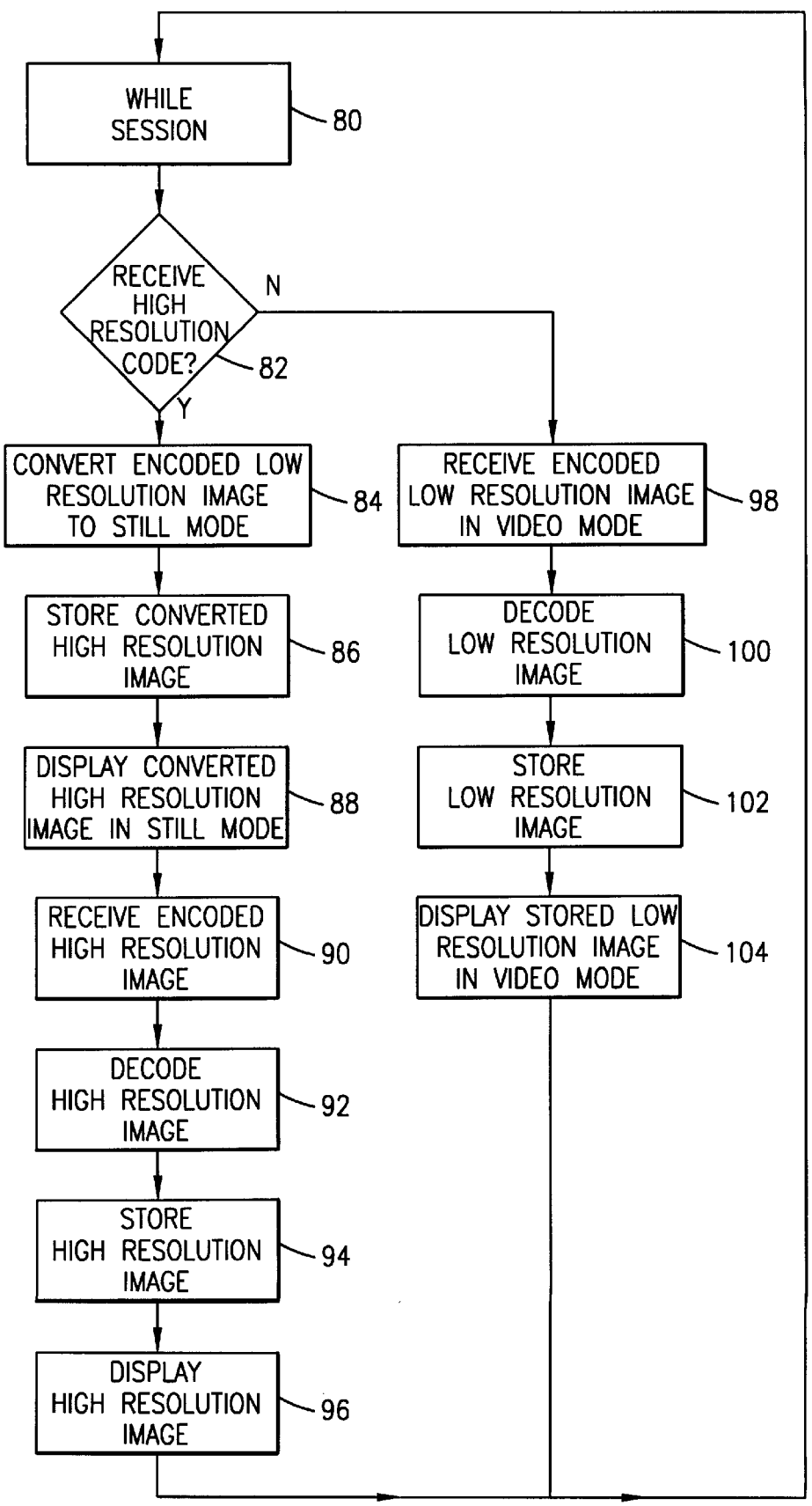
FIG. 3 is a flowchart illustrating various steps in a receiving device of the electronic imaging system of FIG. 1 in accordance with the present invention.

With reference now to FIG. 3, there is shown a flowchart illustrating various additional steps in a method of the present invention, particularly, steps performed within receiver 22. As discussed, while the receiver 22 receives bits (box 80), decoder 24 decodes the various images forwarded to it. When the decoder 24 receives the aforementioned high resolution transmission command or code (box 82), forwarded by the encoder 16 (box 64) and heralding the arrival of high resolution image data, the decoder 24 modifies itself to properly decompress the incoming image pursuant to the aforementioned operational parameters. If the high resolution code is received and the display device 28 is a high performance display terminal, then the encoded low resolution version (box 60), or in the case where no low resolution version of the high resolution image has been created, the last encoded low resolution image (box 72), transmitted to the decoder 24 in FIG. 2 must be converted (box 84) to still mode format within the decoder 24 and stored within the image storage device 26 (box 86) for immediate display on display device 28 (box 88). It should be understood, however, that if the display device 28 is conventional, e.g., a television screen, then an incoming video mode image needs no conversion and may be displayed, as is, immediately. As discussed, the low resolution version of the incoming high resolution image, whether in video or still mode, remains on the display device 28 while the lengthier high resolution image downloads.

During the transmission of the high resolution image from the encoder 16 to the decoder 24 (box 90), segments of the image are typically received and decoded (box 92) by the decoder 24. As a particular segment is thusly decoded, that image segment is forwarded to the picture storage device 26 (box 94) and hence displayed (box 96) on the display device 28. It should, therefore, be understood that some or all of the steps illustrated in boxes 92, 94 and 96 in FIG. 3, as well as the encoding steps in boxes 62, 64 and 66 in FIG. 2, may be repeated a multiplicity of times to adequately manage the proper transmission and reception of the lengthy high resolution image in a corresponding multiplicity of segments.

Upon completion of the display of the high resolution image, overwriting the lower resolution version thereon, control is returned to box 80. With further reference to FIG. 3, if no high resolution command or code has been received (box 82), then the normal video mode operations of reception (box 98), decoding (box 100), storing (box 102) and displaying (box 104) occur, as is understood in the art and as performed in processing the aforementioned low resolution version image.

It should be understood that the captures of the last video frame (box 68) and high resolution image (box 54) preferably occur substantially simultaneously. It should also be understood that the low resolution video mode image stored in the image storage device 26 remains there for display on display device 28 until overwritten or otherwise deleted.

Figure 4A:
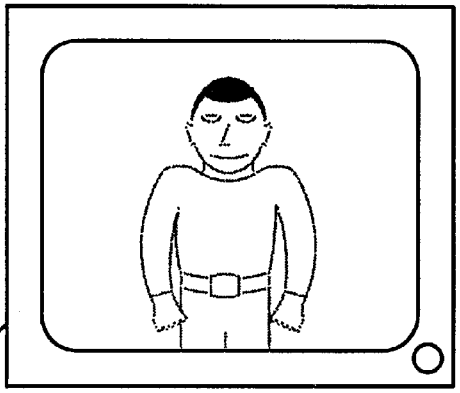
FIGS. 4A–4D illustrate some of the states of image data transfer in accordance with the present invention.
Figure 4B:
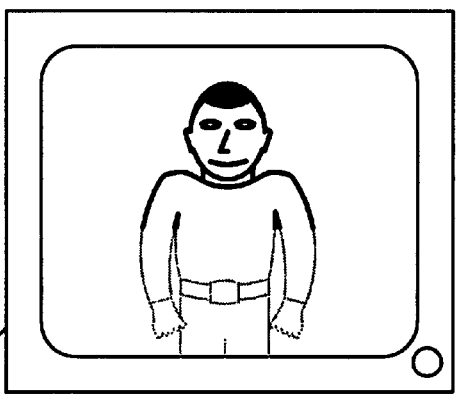
Figure 4C:
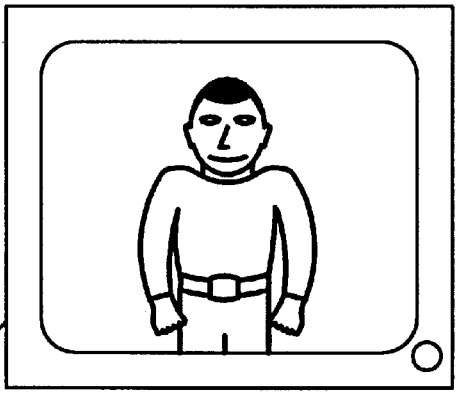

With reference now to FIG. 4A, there is illustrated a low resolution video mode image such as produced and displayed in accordance with the present invention immediately prior to the display of any of the high resolution image segments. As is readily apparent from FIG. 4A, the level of detail or resolution of this image is of low quality. As shown in FIG. 4B, however, a top portion of the low quality, video mode image has been replaced with a higher resolution image segment. As is apparent from FIG. 4C, upon completion of the high resolution image download, the quality of the entire image has improved dramatically. In this manner, the perception to the viewer of display device 28, who requested a detailed, high resolution snapshot of the image received by the camera 10, is that the image arrived quickly and is being continuously improved. This contrasts sharply to the perception of viewers using conventional video systems employing still mode, where the viewers look at an empty display 28 until the high resolution image is processed and displayed, e.g., as an entire image or as segments as discussed. Even though the delay may be only a matter of seconds, the perception of the viewer, e.g., one quite knowledgeable about the capabilities of video systems or even a neophyte, may be that the performance of the video system is too slow. By immediately displaying a gradually improving lower grade version of the intended still image, the viewer's perception of delay is diminished.

Figure 4D:
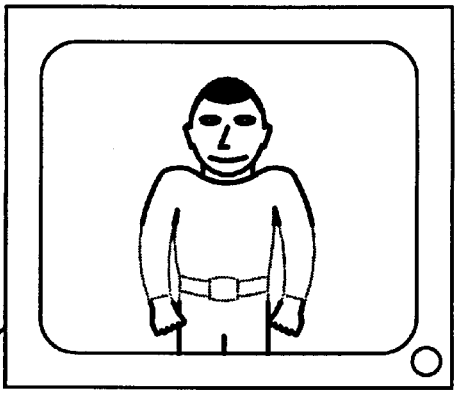

An additional advantage of the present invention over the art is that transmission errors are better masked. For example, if the low resolution of FIG. 4A contains corrupted portions due, e.g., to transmission errors, then the high resolution image to follow overwrites the corrupted portions. Conversely, if the high resolution image contains transmission errors, then the decoder 24 can detect the errors and not display that image segment, thereby not overwriting the otherwise uncorrupted, albeit lower resolution, image already being displayed, as illustrated in FIG. 4D.

In the aforedescribed preferred and alternative embodiments of the present invention, encoder 16 and decoder 24 work together, i.e., encoder 16 forwards two versions of the image, high and low resolution, to the decoder 24, which is configured to handle the normative, and, in an alternate embodiment of the present invention, non-normative aspects of the data transfer. It should, nonetheless, be understood that the encoder 16 and decoder 24 need not do so. For example, if the encoder 16 is unable or incapable of forwarding the dual image, e.g., encoder 16 is of conventional configuration, decoder 24 may overcome this lack of communication with the encoder 16 by converting the last video image (box 72) received before decoding the still image, as described hereinbefore. The converted image, however, may not temporally coincide with the still image although the content should be quite similar. In this instance, the decoding and display of the still image not only improves the image quality but also modifies the image content.

It should be understood that the aforedescribed still image request, such as made by a viewer through interface 30, may instead be generated automatically. For example, an automatic generation means may be based upon the detection of "interesting content" which would trigger the generation of a still image. The trigger could, therefore, be based upon motion, i.e., a motion detector, light variation, sound or a variety of other conditions or combinations thereof.

It should additionally be understood that in view of recent advancements in the field of wireless communications, the subject matter of the present invention may also be applied to other contexts as well, e.g., in wireless videoconferencing. Through recent developments in Global System for Mobile telecommunications (GSM) technology, particularly, in High Speed Circuit Switched Data (HSCSD) protocol, bit transmission capabilities will be boosted to 64 kbit/s or more in the near future through use of multiple GSM channels, making wireless teleconferencing possible. Accordingly, business travelers, using a standard camera and standard software on their laptop computers, may hold videoconferences. Additional uses would be in emergency situations, surveillance, etc.

Videoconference viewers may receive a multiplicity of feeds from other participants, each in video mode. As described herein, however, one of the participants may want a high resolution still image, e.g., a snapshot of one or more of the other participants. Upon receipt of the high resolution command code, the particular camera for the designated participant will capture a still mode image and forward that image back to the requester's computer. As discussed herein, although the video feed from the designated participant may be suspended or slowed during the still image transfer, a low resolution image is forwarded to the requester in accordance with the principles set forth herein and displayed until overwritten by the forthcoming high resolution image.

The previous description is of preferred embodiments for implementing the invention, and the scope of the invention should not necessarily be limited by this description. The scope of the present invention is instead defined by the following claims.

What is claimed is:

1. An imaging system for displaying images pursuant to a multiplicity of display modes, said display modes including at least a video mode and a still mode, said imaging system comprising:

an image processing means for processing a plurality of received images pursuant to a plurality of operational parameters, said received images in video mode comprising a multiplicity of low resolution images and said received images in still mode comprising a high resolution image, said image processing means including a high resolution code with said high resolution still mode image; and a display means, connected to said image processing means, for displaying said images, said display means, upon receiving said high resolution code, capturing a video mode image corresponding to said high resolution image and displaying said video mode image during the transmission of said high resolution image from said image processing means to said display means.

2. The imaging system according to claim 1, wherein said image processing means comprises:

a first processing means, attached to a camera means, for receiving said plurality of received images therefrom; and a second processing means, attached to said first processing means, for forwarding said plurality of received images to said display means.

3. The imaging system according to claim 2, further comprising:

a backchannel, connecting said second processing means to said first processing means, for forwarding a plurality of viewer controls from a viewer at said second processing means to said first processing means.

4. The imaging system according to claim 2, wherein said first processing means comprises:

a subsampler attached to said camera means;

an encoder attached to said subsampler; and a controller, attached to said subsampler and said encoder, said encoder encoding said plurality of received images pursuant to said operational parameters.

5. The imaging system according to claim 4, wherein said camera means forwards an analog signal to said first processing means, said subsampler performing an analog-to-digital conversion of said analog signal to a digital signal, said digital signal comprising said plurality of received images.

6. The imaging system according to claim 4, wherein said second processing means comprises:

a decoder, attached to said encoder, for decoding said plurality of received images pursuant to a plurality of viewer controls from a viewer.

7. The imaging system according to claim 6, further comprising:

a first buffer, attached to said encoder and said controller in said first processing means, for buffering said plurality of received images from said encoder; and a second buffer, attached to said first buffer and said decoder in said second processing means, for buffering said plurality of received images from said first buffer prior to decoding by said decoder.

8. The imaging system according to claim 6, wherein said image processing means further comprises:

a human interface device, attached to said display means, for receiving said plurality of viewers controls; and a translator, attached to said human interface and said decoder, for translating said plurality of viewer controls into an image decoding signal.

9. The imaging system according to claim 8, wherein said translator is connected to said controller via a backchannel, whereby said viewer controls modify the encoder, via said controller, to encode said plurality of received images pursuant to another operational parameter.

10. The imaging system according to claim 8, wherein said human interface device is selected from the group consisting of a button, slide, keyboard and remote device.

11. An imaging system for displaying images pursuant to a multiplicity of display modes, said display modes including at least a video mode and a still mode, said imaging system comprising:

an image processing means for processing a plurality of received images pursuant to a plurality of operational parameters, said received images in video mode comprising a multiplicity of low resolution images and said received images in still mode comprising a high resolution image, said image processing means upon receiving a still image request capturing a high resolution still mode image and creating a low resolution version therefrom; and a display means, connected to said image processing means, for displaying said images, said display means, upon receiving said low resolution version, displaying said low resolution version during the transmission of said high resolution image from said image processing means to said display means.

12. The imaging system according to claim 2, wherein said image processing means comprises:

a first processing means, attached to a camera means, for receiving said plurality of received images therefrom; and a second processing means, attached to said first processing means, for forwarding said plurality of received images to said display means.

13. The imaging system according to claim 12, further comprising:

a backchannel, connecting said second processing means to said first processing means, for forwarding a plurality of viewer controls from a viewer at said second processing means to said first processing means.

14. The imaging system according to claim 12, wherein said first processing means comprises:

a subsampler attached to said camera means;

an encoder attached to said subsampler; and a controller, attached to said subsampler and said encoder, said encoder encoding said plurality of received images pursuant to said operational parameters.

15. The imaging system according to claim 14, wherein said camera means forwards an analog signal to said first processing means, said subsampler performing an analog-to-digital conversion of said analog signal to a digital signal, said digital signal comprising said plurality of received images.

16. The imaging system according to claim 14, wherein said second processing means comprises:

a decoder, attached to said encoder, for decoding said plurality of received images pursuant to a plurality of viewer controls from a viewer.

17. The imaging system according to claim 16, further comprising:

a first buffer, attached to said encoder and said controller in said first processing means, for buffering said plurality of received images from said encoder; and a second buffer, attached to said first buffer and said decoder in said second processing means, for buffering said plurality of received images from said first buffer prior to decoding by said decoder.

18. The imaging system according to claim 16, wherein said image processing means further comprises:

a human interface device, attached to said display means, for receiving said plurality of viewers controls; and a translator, attached to said human interface and said decoder, for translating said plurality of viewer controls into an image decoding signal.

19. The imaging system according to claim 18, wherein said translator is connected to said controller via a backchannel, whereby said viewer controls modify the encoder, via said controller, to encode said plurality of received images pursuant to another operational parameter.

20. The imaging system according to claim 18, wherein said human interface device is selected from the group consisting of a button, slide, keyboard and remote device.

21. In an imaging system, a method for displaying images on a display device, said method comprising the steps of:

displaying a plurality of low resolution images on said display device;

upon receipt of a high resolution command, capturing a high resolution image for display on said display device;

converting said high resolution image into a low resolution version thereof;

displaying said low resolution version on said display device; and downloading and displaying said high resolution image on said display device, said high resolution image overlaying said low resolution version on said display device during said download.

22. The method according to claim 21, wherein, during said step of downloading said high resolution image, said high resolution image is divided into a multiplicity of segments, said segments sequentially overlaying said low resolution version.

23. The method according to claim 21, wherein said low resolution images are video images.

24. The method according to claim 21, wherein said high resolution image is a still image.

25. The method according to claim 24, wherein said low resolution version of said high resolution image is a video image.

* * * * *

UNITED STATES PATENT AND TRADEMARK OFFICE
CERTIFICATE OF CORRECTION

PATENT NO. : 6,038,257
APPLICATION NO. : 08/815805
DATED : March 14, 2000
INVENTOR(S) : Harald Brusewitz et al.

It is certified that error appears in the above-identified patent and that said Letters Patent is hereby corrected as shown below:

| | |
|---|---|
| Column 4, line 65 | Replace "nonnormative" With --non-normative-- |
| Column 8, line 51 | After "means" Insert -- , said high resolution image overwriting said video mode image corresponding thereto on said display means during said transmission-- |
| Column 9, line 59 | After "means" Insert -- , said high resolution image overwriting said low resolution version on said display means during said transmission-- |
| Column 10, line 66 | Replace "overlaying" With --overwriting-- |

Signed and Sealed this

Seventeenth Day of July, 2007

JON W. DUDAS
*Director of the United States Patent and Trademark Office*